US012704428B2

(12) United States Patent
Brosnan et al.

(10) Patent No.: US 12,704,428 B2
(45) Date of Patent: Aug. 11, 2026

(54) SENSORS FOR MEASURING PRESSURE AND TEMPERATURE

(71) Applicant: Simmonds Precision Products, Inc., Vergennes, VT (US)

(72) Inventors: Kristen Brosnan, Colchester, VT (US); Peter J. Carini, Underhill, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 295 days.

(21) Appl. No.: 18/515,722

(22) Filed: Nov. 21, 2023

(65) Prior Publication Data

US 2025/0164333 A1 May 22, 2025

(51) Int. Cl.
*G01L 9/00* (2006.01)
*G01L 19/00* (2006.01)

(52) U.S. Cl.
CPC ........ *G01L 9/0076* (2013.01); *G01L 19/0092* (2013.01)

(58) Field of Classification Search
CPC ..... G01L 9/0079; G01L 1/242; G01L 11/025; G01L 19/04; G01L 19/0092; G01L 19/0627; G01L 19/0636; G01L 19/147; G01L 9/0075; G01L 1/246; G01L 7/086; G01L 9/0076; G01L 11/02; G01J 3/26; G01J 3/0286; G01J 3/0218; G01J 3/024; G01J 3/0208; G01J 3/108; G01J 3/02; G01J 3/0229; G01J 3/0256; G01J 3/0289; G01J 3/4532; G02B 6/29395; G02B 6/29358; G02B 6/4204; G02B 6/4225; G02B 26/02; G02B 6/29361; G02B 6/29398; G02B 6/4214; G02B 6/4246; G02B 6/4249; G02B 6/4251; G02B 6/4263; G02B 6/4286; G02B 26/124; G02B 6/29311; G02B 6/29367; G02B 6/4206; G02B 6/4215; G02B 6/4224; G02B 6/4266; G02B 26/001; G02B 26/10; G02B 6/3548; G02B 6/3512; G02B 6/3568; G02B 6/358; G02B 26/0875; G02B 5/0825; G02B 6/29394; G02B 6/3833;

(Continued)

(56) References Cited

U.S. PATENT DOCUMENTS

| | | |
|---|---|---|
| 4,768,886 A | 9/1988 | Hirschfeld et al. |
| 7,330,271 B2 | 2/2008 | Frick |

(Continued)

FOREIGN PATENT DOCUMENTS

| | | | |
|---|---|---|---|
| CN | 102384809 B * | 5/2013 | .............. G01L 11/02 |
| CN | 102694339 B | 8/2013 | |

(Continued)

OTHER PUBLICATIONS

Extended European Search Report for EP Application No. 24214551.4, dated Apr. 29, 2025, 8 pages.

*Primary Examiner* — Michael P Stafira
(74) *Attorney, Agent, or Firm* — Tucker Ellis LLP

(57) ABSTRACT

A Fabry-Pérot sensor assembly includes an optical element defining a Fabry-Pérot optical cavity therein. A sensor ferrule is affixed to the optical element. The sensor ferrule is configured to physically connect to an optical fiber, aligning the optical fiber optically with the cavity. The optical element includes a LaGd doped hafnium or zirconium oxide ceramic or Nd:YAG ceramic or single crystals.

19 Claims, 3 Drawing Sheets

(58) Field of Classification Search
CPC ........ G02B 7/188; G02B 26/08; G02B 6/293; G02B 6/29359; G02B 6/29374; G02B 6/2551; G02B 6/264; G02B 6/266; G02B 6/32; G02B 6/3514; G02B 6/353; G02B 6/3562; G02B 6/3608; G02B 6/3612; G02B 6/3628; G02B 6/3845; G02B 6/3846; G02B 6/3861; G02B 6/3878; G02B 6/3888; G02B 6/3889; G02B 6/4201; G02B 6/4202; G02B 6/4237; G02B 6/4239; G02B 6/424; G02B 6/4244; G02B 6/4257; G02B 6/4267; G02B 6/4277; G02B 6/4292; G02B 9/02
See application file for complete search history.

(56) References Cited

U.S. PATENT DOCUMENTS 7,511,823 B2 * 3/2009 Schultz .............. G01D 5/35303 356/480
7,614,308 B2 11/2009 Berner et al.
7,970,039 B2 6/2011 Mason et al.
11,150,144 B2 10/2021 Dong et al.
12,104,933 B2 * 10/2024 Sakamoto ................. G01L 5/24
2006/0132792 A1 * 6/2006 Schultz ................... G01L 9/008 356/480
2012/0094112 A1 * 4/2012 Imran ................. C03C 17/3681 204/192.1
2014/0208858 A1 7/2014 Jiang et al.
2017/0082514 A1 * 3/2017 Duplain .............. G01L 19/0046

FOREIGN PATENT DOCUMENTS

CN 103557929 A 2/2014
CN 105093440 A * 11/2015 ........... G02B 6/4244
CN 108680276 A * 10/2018 ............. G01K 11/32
CN 108896232 A * 11/2018 ............. G01L 7/086
CN 208043243 U * 11/2018
CN 109478754 A * 3/2019 ........... H01S 3/0627
CN 115165068 A * 10/2022 ............... G01H 9/00
DE 4125485 A1 2/1993
EP 0456681 B1 * 3/1994 ............. G01D 5/268
EP 4617633 A1 * 9/2025 ........... G01L 9/0079

* cited by examiner 100
102
104
106
110
108
112
A
A 100
102
118
104
122
106
122
110
A
A
108
116
120
114

SENSORS FOR MEASURING PRESSURE AND TEMPERATURE

BACKGROUND

1. Field

The present disclosure relates to sensors for pressure and temperature, and more particularly to Fabry-Pérot cavity optical sensors for pressure and temperature.

2. Description of Related Art

Fabry-Pérot cavity sensors can measure pressure, temperature, or both. The sensor includes a diaphragm that responds to a change in temperature or pressure, a base connected to the diaphragm, an optical cavity, and an optical fiber that may conduct light reflected off of a surface of the diaphragm. An interrogator may be provided for detecting a deflection of the diaphragm. Changes in size of the cavity change the interference of reflected light in the interrogator, which can be calibrated to infer temperature or pressure or both.

The conventional techniques have been considered satisfactory for their intended purpose. However, there is an ever present need for improved systems and methods for Fabry-Pérot cavity optical sensors. This disclosure provides a solution for this need.

SUMMARY

A Fabry-Pérot sensor assembly includes an optical element defining a Fabry-Pérot optical cavity therein. A sensor ferrule is affixed to the optical element. The sensor ferrule is configured to physically connect to an optical fiber, aligning the optical fiber optically with the cavity. The optical element includes a LaGd doped hafnium or zirconium oxide ceramic (La0.8Gd1.2Hf2O7 or LaGdZr2O7, nominally) or Nd doped yttrium aluminum garnet (Nd:YAG) ceramic or single crystal.

The optical fiber can be affixed within the sensor ferrule optically aligned with the cavity. The sensor ferrule can include external features configured of mechanical attachment of the sensor ferrule to a housing. An interrogator can be optically connected to the optical fiber. The interrogator can be configured to illuminate the cavity through the optical fiber, to receive reflected spectrum from the cavity, and to measure temperature and/or pressure of the cavity based on the reflected spectrum.

The sensor ferrule can define a bore for receiving the optical fiber which may contain a fiber ferrule. The bore can extend along a longitudinal axis that extends through the cavity. The cavity can be defined between a first optical member and a third optical member spaced apart from the first optical member thus forming the second optical member along the longitudinal axis. An optical path is created from the bore, through the first optical member, through the cavity constituting the second optical member, allowing light to reflect off of the third optical member thus passing back through the cavity and through the first optical member into the bore and back into the fiber.

The third optical member can be an endplate with an at least partially mirrored surface for increasing signal reflections through the cavity. The first optical member can be part of a main sensor body, wherein the ferrule is affixed to the main sensor body. The first and third optical members can be directly affixed to one another, wherein at least one of the first and third optical members is $La_{0.8}Gd_{1.2}Hf_2O_7$ ceramic. At least one of the first and third optical members can be $LaGdZr_2O_7$ ceramic. At least one of the first and third optical members can be ND:YAG ceramic or single crystal (nominally $Y_3Al_5O_{12}$ with 1 mol % Nd dopant). An anti-reflective coating can be included on at least one surface of the optical element.

The cavity can be defined in the first optical member. The first optical member can include a rim surrounding the cavity peripherally. The end plate can be affixed to the cavity rim.

The cavity can be defined in the third optical member. The third optical member can include a rim surrounding the cavity peripherally. The first optical member can be affixed to the cavity rim.

A ring can be affixed between the first and third optical members. The cavity can be bounded by the cavity ring and the first and third optical members.

A method of making a Fabry-Pérot optical cavity includes using a ceramic processing etching process to remove material from a first optical member to form the cavity therein, leaving a rim of the optical member surrounding the cavity peripherally. The method includes affixing a third optical member to the rim to enclose the cavity.

The first and/or third optical member can be of LaGd doped hafnium or zirconium oxide ceramic. The first and/or third optical member can be of Nd:YAG ceramic or single crystal. The third optical member can be a diaphragm configured to deflect more than the first optical member under external pressure changes.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
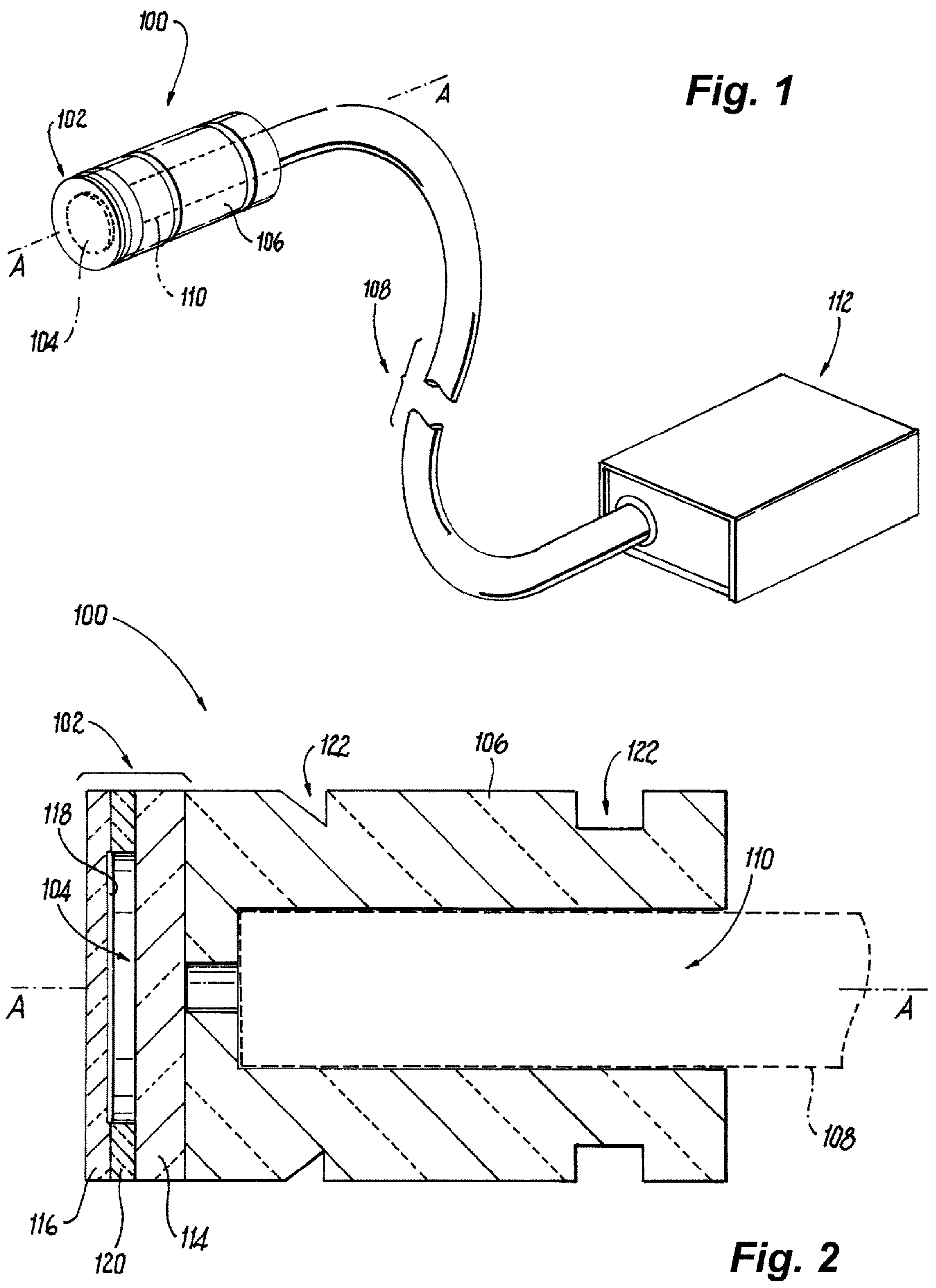
FIG. 1 is a schematic perspective view of an embodiment of a sensor assembly constructed in accordance with the present disclosure, showing the optical fiber, the interrogator, and the Fabry-Pérot optical element with sensor ferrule.
FIG. 2 is a schematic cross-sectional elevation view of the optical element and ferrule of FIG. 1.

Reference will now be made to the drawings wherein like reference numerals identify similar structural features or aspects of the subject disclosure. For purposes of explanation and illustration, and not limitation, a partial view of an embodiment of a sensor assembly in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to facilitate manufacture of Fabry-Pérot sensors for optically based temperature and pressure measurements.

Figure 4:
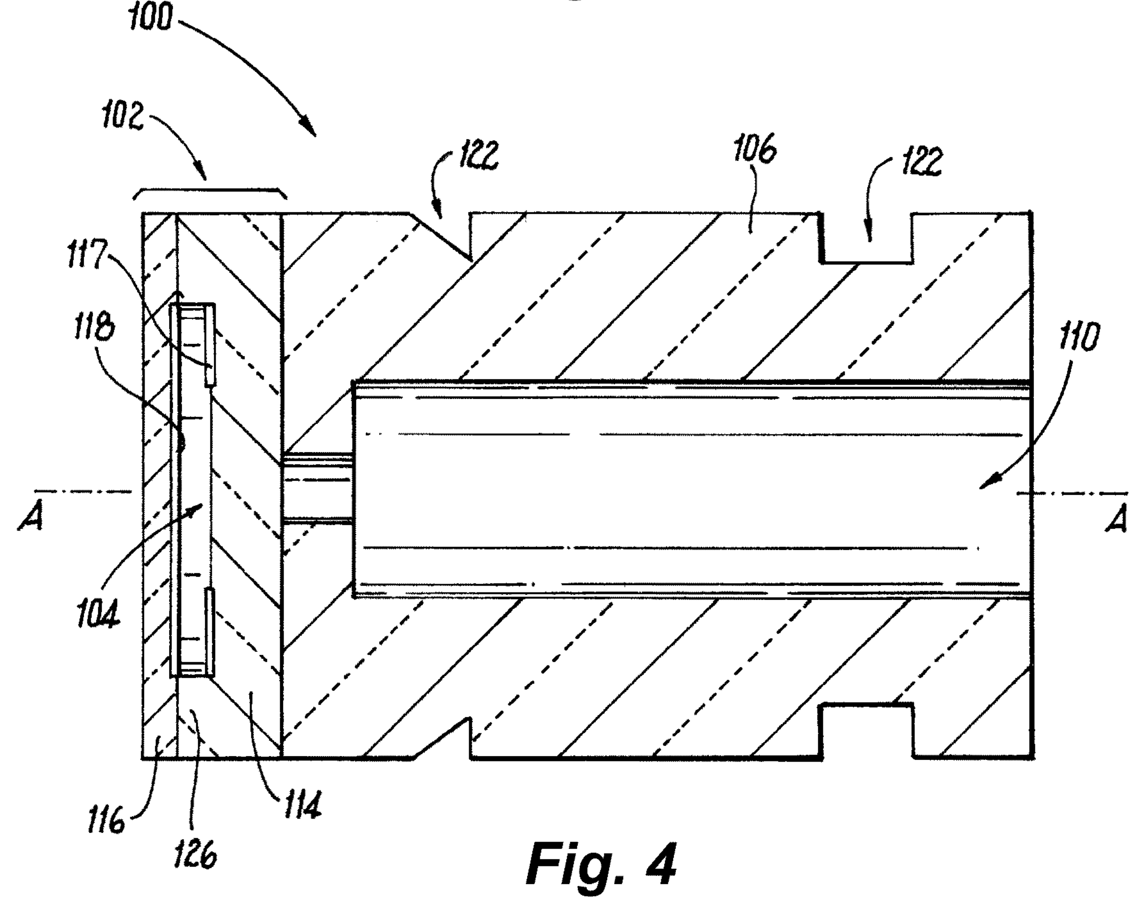
FIG. 4 is a schematic cross-sectional elevation view of an embodiment of the optical element and sensor ferrule of FIG. 2, showing the optical cavity formed in the first optical member, where the second optical member is the optical cavity itself and the third optical member is a diaphragm.
Figure 5:
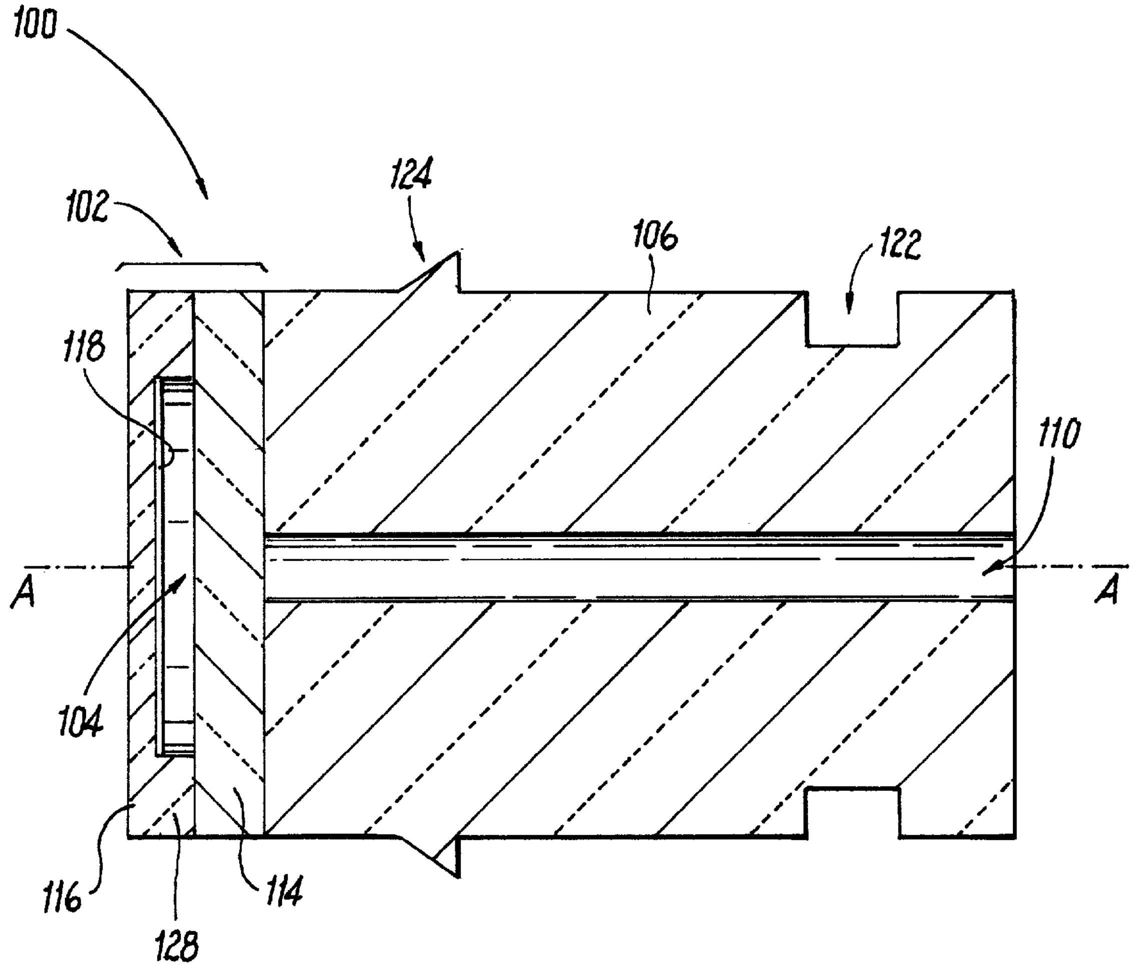
FIG. 5 is a schematic cross-sectional elevation view of an embodiment of the optical element and sensor ferrule of FIG. 2, showing the optical cavity formed by the third optical member, which is the diaphragm.

The Fabry-Pérot sensor, i.e. etalon, assembly 100 includes an optical element 102 defining a Fabry-Pérot optical cavity 104 therein. A sensor ferrule 106 is affixed to the optical element 102. The sensor ferrule 106 is physically connected to an optical fiber 108 which may have its own fiber ferrule, thereby aligning the optical fiber 108 optically with the cavity 104 thereby ensuring optical alignment with the optical element 102. The optical element 102 includes a LaGd doped hafnium or zirconium oxide ceramic, and the sensor ferrule 106 optionally includes a LaGd doped hafnium or zirconium oxide ceramic. The optical fiber 108 is affixed within a bore 110 the ferrule 106 optically aligned with the cavity 104. Additionally, bore 110 may also accommodate a fiber ferrule on the sensor end of 108 in order to facilitate optical alignment and spacing of the core of the optical fiber with the optical element 102 (FIG. 4 shows a cavity in the sensor ferrule that can accommodate a fiber with ferrule. FIG. 5 shows a configuration for a fiber without the fiber ferrule). An interrogator 112 is optically connected to the optical fiber 108, i.e. to an end of the optical fiber 108 opposite then end of the optical fiber 108 that is connected to the sensor ferrule 106. The interrogator 112 is thus configured to illuminate the optical cavity 104 through the optical fiber 108, to receive reflected spectrum from the cavity 104, and to measure temperature and/or pressure exhibited on the optical element 102 based on the reflected spectrum.

Figure 3:
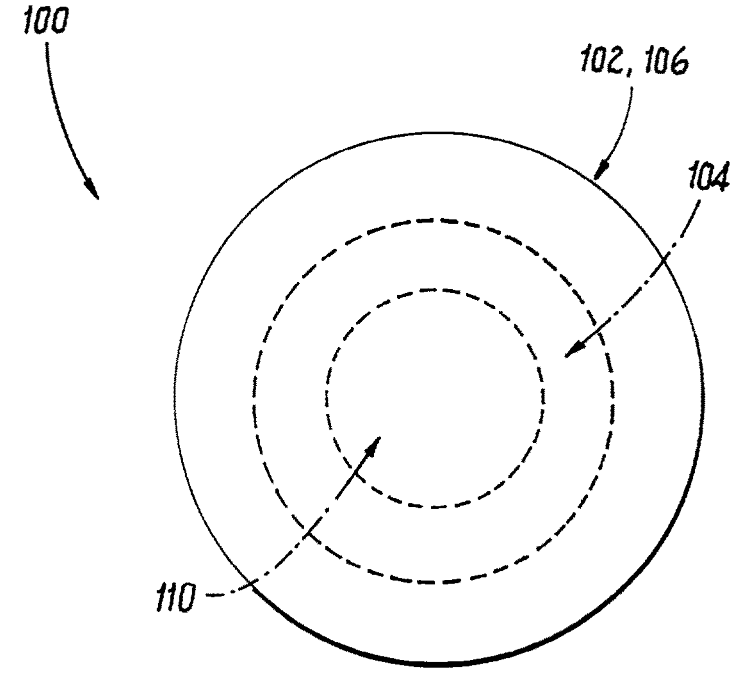
FIG. 3 is a schematic axial end view of the optical element and sensor ferrule of FIG. 2.

With reference now to FIG. 2, the sensor ferrule 106 defines a bore 110 for receiving the optical fiber 108. The bore 110 extends along a longitudinal axis A that extends through the cavity 104. The cavity 104 is defined axially between a first optical member 114 and a third optical member 116 that are spaced apart from one another along the longitudinal axis A. An optical path is comprised from the bore 110 and fiber 108 along the axis A, through the first optical member 114, and through the second optical member, cavity 104, subsequently reflecting off of the third optical member 116 and eventually passing back through the cavity 104 and back through the first optical member 114 into the bore 110 and fiber 108. Note that it is possible to directly couple the fiber core with the first optical member 114. FIG. 3 shows the cavity 104, bore 110, and the combination of the sensor ferrule 106 and optical element 102 as viewed into the longitudinal axis of FIG. 2. An anti-reflective coating can be included on at least one surface of the optical element 102 including the exposed surface of the first optical member 114 to the end of bore 110, which is most desirable, the inside cavity 104 which constitutes the second optical member, or the exterior axial face of the endplate. In certain application, it may be desirable to make use of a reflective coating 118 on the third optical member 116 in order to improve signal to noise response. Likewise, it is contemplated that a mirrored ring 117 on the surface of the first optical member 114 can be included, faying with the second optical member, cavity 104, provided that the mirrored surface of the ring does not interfere with light propagation along axis A of the end of bore 110 that interfaces with the first optical member 114.

With continued reference to FIG. 2, the third optical member 116 is an endplate, i.e. a diaphragm that can deflect under pressure changes, with an at least partially mirrored surface 118 inside the cavity 104 for increasing signal reflections through the cavity 104. The first optical member 114 constitutes a main sensor body, which is thicker/stiffer than the diaphragm of the optical member 116 such that it does not deflect under pressure changes as much as the diaphragm. The sensor ferrule 106 is affixed to the main sensor body 114. A cavity ring 120 is affixed between the first and third optical members 114, 116 hereby generating the pressure sensitive depth of the second optical member, optical cavity 104. The optical cavity 104 is bounded by the cavity ring 120 and by the first and third optical members 114, 116. At least one of cavity ring 120, the first optical member 114, and the third optical member 116 is transparent ceramic, e.g. a LaGd doped hafnium or zirconium oxide ceramic such as $La_{0.8}Gd_{1.2}Hf_2O_7$ ceramic or $LaGdZr_2O_7$ ceramic. It is also contemplated that at least one of the cavity ring 120, the first optical member 114, and the third optical member 116 can be of Nd:YAG ceramic or single crystal. The Nd:YAG can be Nd doped YAG (e.g., $Y_{2.97}Nd_{0.03}Al_5O_{12}$) ceramic or single crystal, which has a cubic crystal structure, a melting point of 1950° C., and is transparent with a range of 1.1-4.8 mol % Nd, where $Y_{2.97}Nd_{0.03}Al_5O_{12}$ is nominally $Y_3Al_5O_{12}$ with 1 mol % Nd dopant. The sensor ferrule 106 includes external mating and locking features, i.e., radially inward extending features 122, or radially outward extending features 124 as shown in FIG. 5, configured for mechanical attachment of the sensor ferrule 106 to a housing or assembly.

With reference now to FIG. 4, the cavity ring 120 can be omitted since the first optical member 114 defines the unburdened optical cavity 104. The first and third optical members 114, 116 can be directly affixed to one another, wherein at least one of the first and third optical members 114, 116 is a single piece of transparent ceramic. In FIG. 4, the second optical member, optical cavity 104, is defined in the first optical member 114, which includes a cavity rim 126 formed of the same transparent ceramic as the rest of the first optical member 114, surrounding the optical cavity 104 peripherally as does the ring 120 in FIG. 2. The end plate, i.e. optical member 116 or diaphragm, is affixed to the cavity rim 126 after the optical cavity 104 is formed in the first optical member 114 as described below. With reference now to FIG. 5, the optical cavity 104 can be defined by the third optical member 116 instead. The third optical member 116 in FIG. 5 hereby includes a cavity rim 128, i.e. of the same transparent ceramic as the rest of the third optical member 116. The cavity rim 128 in FIG. 5 surrounds the cavity peripherally just as the cavity rim 126 in FIG. 4 or the cavity ring in FIG. 2. In FIG. 5, the cavity rim 128 is affixed to the first optical member 114 after the cavity 118 is formed in the third optical member 116.

A method of making a Fabry-Pérot optical cavity as described above with respect to FIGS. 4-5 includes using a ceramic processing etching process to remove material from an optical member 114, 116 to form the optical member, optical cavity 104 therein, leaving a cavity rim 126, 128 of the optical member 114, 116 thereby surrounding the optical cavity 104 peripherally. The method includes affixing the remaining optical member 114, 116 (from which the cavity 104 was not formed) to the cavity rim 126, 128 to enclose the optical cavity 104. It is also contemplated that the optical cavity could be partially removed from both optical members 114, 116 without departing from the scope of this disclosure. Whether the first or third optical member 114, 116, or both, have material removed to form the optical cavity 104, the remaining structure of the third optical member 116 needs to have a diaphragm thin enough to deflect for the measurements of interest, as described above.

This is an approach to measuring pressure and temperature using a Fabry-Pérot cavity and optical fiber without the need to have all or any single crystal aluminum oxide (or sapphire, nominally $Al_2O_3$) elements. Systems and method as disclosed herein provide potential benefits including the following: lower cost of materials, more cost effective manufacturing, ease of machining, and simpler housing attachments. This approach enables possible attachment of the optical element 102 to the ferrule 106 using bonding approaches similar to glass. The optical structures can be manufactured to high dimensional tolerances using bisque fire methods with secondary machining or machining in the green ceramic state (unfired) followed by sintering. Standard sintering processes may also be used that are lower in temperature (<1650° C.) than the sapphire processing temperature (nominally 2070° C.). It is also contemplated that Hot Isostatic Press (HIP) methods can be utilized in different ways. One option would be to HIP the entire structure together, or HIP certain pieces of the assembly separately and sinter the pieces together to form a bond. This opens up a multitude of manufacturing options which are not available to components made out of sapphire.

In addition to the previously stated potential advantages over sapphire based sensors, the optical sensors disclosed herein are inherently advantageous over micro-electromechanical system (MEMS) sensors for the chosen measurand. Unlike MEMS sensors, the aforementioned optical sensors do not have preferential directionality (i.e., the measurements can be made regardless of sensor orientation).

The methods and systems of the present disclosure, as described above and as shown in the drawings, provide for facilitating the manufacture of Fabry-Pérot sensors for optically based temperature and pressure measurements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A Fabry-Perot sensor assembly comprising:
- an optical element defining a Fabry-Perot optical cavity therein, wherein the optical element comprises:
  - a first optical member comprising an endplate with an at least partially mirrored surface; and
  - a second optical member connected directly to the first optical member and axially adjacent to the first optical member with respect to a longitudinal axis of the Fabry-Perot sensor assembly; and
- a sensor ferrule affixed to the second optical member, wherein the sensor ferrule defines a bore extending along the longitudinal axis to the second optical element;
- wherein at least one of the first and second optical members is formed from a zirconate ceramic comprising at least one rare earth metal, or is formed from a hafnate ceramic comprising the at least one rare earth metal.

2. The assembly as recited in claim 1, wherein the at least one rare-earth metal comprises Lanthanum (La) and Gadolinium (Gd).

3. The assembly as recited in claim 2, wherein a mirrored ring is on the second optical member and faying with the Fabry-Perot optical cavity.

4. The assembly as recited in claim 1, wherein both the first and second optical members are formed from the hafnate ceramic.

5. The assembly as recited in claim 1, wherein both the first and second optical members are formed from the zirconate ceramic.

6. The assembly as recited in claim 4, wherein the second optical member is a main sensor body.

7. The assembly as recited in claim 1, wherein at least one of the first and second optical members is formed from $La_{0.8}Gd_{1.2}Hf_2O_7$ ceramic.

8. The assembly as recited in claim 1, wherein at least one of the first and second optical members is formed from $LaGdZr_2O_7$ ceramic.

9. The assembly as recited in claim 2, wherein the optical cavity is defined in the first optical member, wherein the first optical member includes a cavity rim extending axially from the endplate and surrounding the cavity peripherally, and wherein the second optical member is affixed to the cavity rim.

10. The assembly as recited in claim 9, wherein the second optical member includes a cavity rim surrounding the Fabry-Perot optical cavity peripherally, and wherein the first optical member is affixed to the cavity rim.

11. The assembly as recited in claim 3, further comprising anti-reflective coating on at least one surface of the optical element.

12. The assembly as recited in claim 1, wherein the first optical member is a diaphragm configured to deflect more than the third optical member under external pressure changes.

13. A Fabry-Perot sensor assembly comprising:
- an optical element defining a Fabry-Perot optical cavity therein, wherein the optical element comprises:
  - a first optical member comprising an endplate with an at least partially mirrored surface; and
  - a second optical member connected directly to the first optical member and axially adjacent to the first optical member with respect to a longitudinal axis of the Fabry-Perot sensor; and
- a sensor ferrule affixed to the optical element, wherein the sensor ferrule is configured to physically connect to an optical fiber, optically aligning and spacing the optical fiber with the optical cavity, and wherein at least one of the first optical member and the second optical member is formed from a yttrium aluminum garnet (YAG) ceramic doped with a rare earth metal or is formed from a YAG single crystal doped with the rare earth metal.

14. The assembly as recited in claim 13, further comprising a cavity ring extending around the Fabry-Perot optical cavity and between the first optical member and the second optical member.

15. The assembly of claim 14, wherein the rare-earth metal is neodymium (Nd).

16. The assembly of claim 15, wherein both the first and second optical members are formed from the YAG ceramic.

17. The assembly of claim 15, wherein both the first and second optical members are formed from the YAG single crystal.

18. The assembly of claim 1, wherein the sensor ferrule is formed from the zirconium oxide ceramic comprising the at least one rare earth metal, or is formed from the hafnium oxide ceramic comprising the at least one rare earth metal.

19. The assembly of claim 13, wherein the sensor ferrule is formed from the YAG ceramic doped with the rare earth metal, or is formed from the YAG single crystal doped with the rare earth metal.

* * * * *